United States Patent [19]

Van Dalfsen

[11] Patent Number: 5,311,684

[45] Date of Patent: May 17, 1994

[54] SCOOPING APPARATUS, VEHICLE AND COUPLING PLATE THEREFORE

[76] Inventor: Rudolf Van Dalfsen, Buitenhaven 2, NL-8281 BL Genemuiden, Netherlands

[21] Appl. No.: 16,498

[22] Filed: Feb. 10, 1993

Related U.S. Application Data

[63] Continuation-in-part of Ser. No. 694,644, May 2, 1991, abandoned.

[30] Foreign Application Priority Data

May 4, 1990 [NL] Netherlands .......................... 9001080

[51] Int. Cl.⁵ .............................. E02F 3/76; B07B 1/49
[52] U.S. Cl. .......................................... 37/409; 37/403;
37/417; 37/441; 37/903; 209/421
[58] Field of Search ................. 37/409, 403, 442, 318,
37/241, 461, 903, 417, 429, 435, 436, 467, 441,
232, 233; 294/106; 171/128, 129; 414/726;
209/235, 284, 420, 421

[56] References Cited

U.S. PATENT DOCUMENTS

| | | | |
|---|---|---|---|
| 1,974,717 | 9/1934 | Le Bleu | 37/140 |
| 2,422,985 | 6/1947 | Reckler | 262/2 |
| 2,648,921 | 8/1953 | Brown | 37/140 |
| 2,704,604 | 3/1955 | Rolston | 209/235 |
| 2,979,215 | 4/1961 | Brisson | 37/117.5 |
| 3,003,265 | 10/1961 | Lutjens | 37/117.5 |
| 3,072,257 | 1/1963 | Hockenberry | 209/421 |
| 3,765,490 | 10/1973 | Logue | 171/132 |
| 4,051,614 | 10/1977 | Diggs | 37/118 A X |
| 4,189,386 | 2/1980 | Aman | 37/183 R X |
| 5,002,656 | 3/1991 | Johansson | 209/421 |

FOREIGN PATENT DOCUMENTS

| | | | |
|---|---|---|---|
| 22148/29 | 8/1929 | Australia | 37/140 |
| 0047041 | 3/1982 | European Pat. Off. . | |
| 0106412 | 10/1983 | European Pat. Off. . | |
| 1512206 | 12/1974 | United Kingdom . | |
| 2121761 | 1/1984 | United Kingdom | 37/183 R |

Primary Examiner—Randolph A. Reese
Assistant Examiner—J. Russell McBee
Attorney, Agent, or Firm—Willian Brinks Hofer Gilson & Lione

[57] ABSTRACT

A scooping apparatus is disclosed having a carrying frame coupled with a vehicle.

A cage having two cage parts, namely a scooping part and a lid are carried by the frame. The rotation axis of the lid part relative to the scooping part extending on a radial distance from the rotating axis of the cage amounts to zero to two thirds of the radius of the cage.

A first driving means for rotatably driving at least one of the cage parts. A second driving means for moving the cage parts between the closed position and the open position such that a rotation axis of the lid part relative to the scooping part extending on a radial distance from a rotating axis of the cage amounting to zero to two thirds of the radius of the cage.

35 Claims, 11 Drawing Sheets

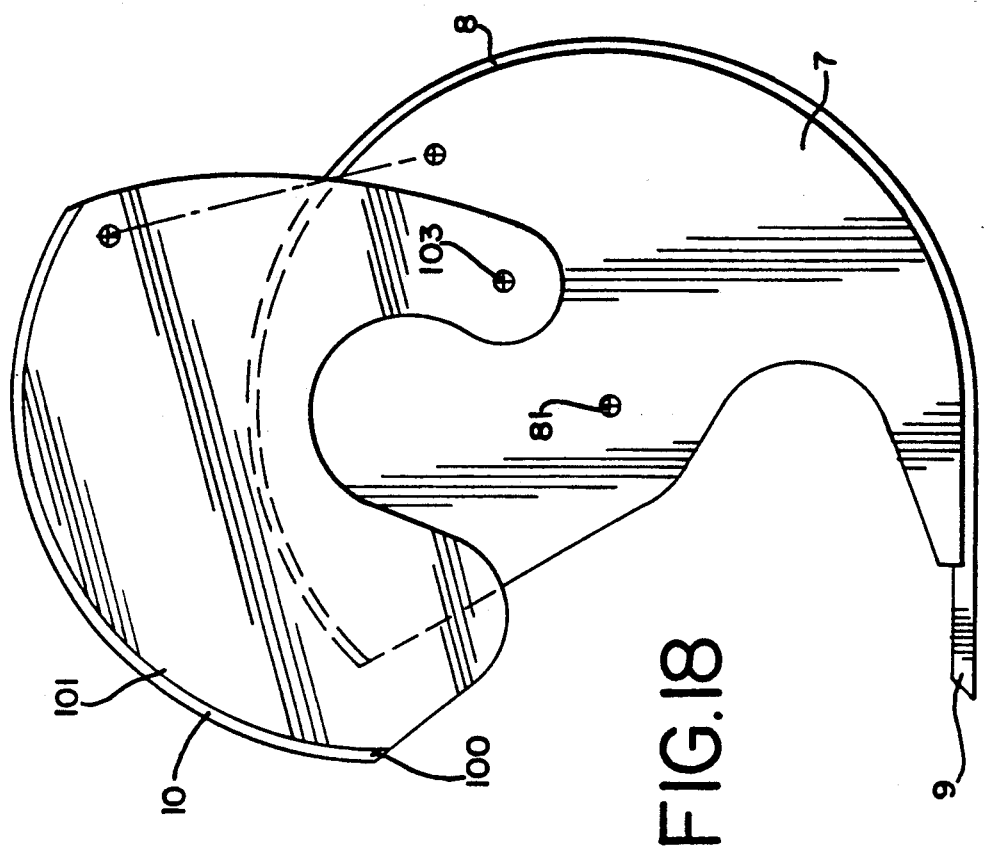
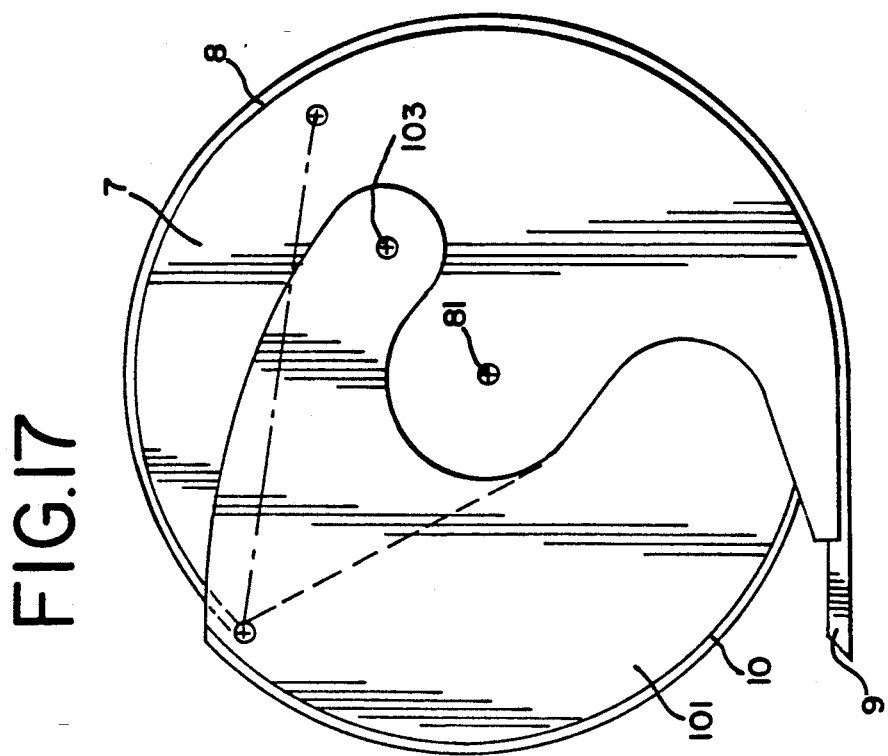

1

SCOOPING APPARATUS, VEHICLE AND COUPLING PLATE THEREFORE

This application is a continuation-in-part of application Ser. No. 07/694,644, filed May 2, 1991 now abandoned.

BACKGROUND OF THE INVENTION

The invention relates to a scooping apparatus to be coupled with a vehicle, said apparatus comprising:

a carrying frame to be coupled with said vehicle by means of coupling means, a substantially cylindrical cage rotatably carried by said frame, said cage comprising:

two end walls rotatably connected with said frame by means of rotation bearings, two cage parts carried by said end walls, namely a scooping part having a scooping edge, and a lid part, said two cage parts being relatively movable between a closed position in which they form the cage, and an open position and one of which has at least one opening, in such a way that that cage part has a substantial opening degree, first driving means for rotatably driving at least one of said cage parts;

and second driving means for moving the cage parts between the closed position and the open position.

Such an apparatus is known from the European patent application EP-0 047 041.

In this prior art construction the two cage parts are hingeably interconnected around a hinge-axis substantially extending in the longitudinal direction of the cylinder plane of the cage.

SUMMARY OF THE INVENTION

It is a purpose of the invention to design the scooping apparatus of this kind in such a way that it has a simpler construction and uses less space in the open position of the cage. In view thereof, the scooping apparatus, according to the invention, is characterized in that the two cage parts are movable in coaxial relation with the cylinder axis of the cage.

Preferably, the apparatus is characterized by first locking means for locking the lid part in at least one angular position relative to the frame. In this cage, after the locking of the lid part by means of the first locking means, the scooping part can be further rotated by continued energization of the first driving means. In this way, it is achieved that one can refrain from the use of the said second driving means.

In order to be able to rotate the cage in its closed position as a result of which the cage can be operative for cleaning scooped material, mixing different materials and the like simple use may be made of second locking means for locking the two cage parts against relative rotation in the closed position.

In this connection, a very simple embodiment is characterized in that the second locking means comprise:

a sloping cam arranged at the one cage part and a spring loaded pall present at the other cage part and cooperating with said sloping cam.

Furthermore, the invention relates to an embodiment which is characterized by auxiliary means arranged in the cage. In this connection, it should be understood that a user of a scooping apparatus wishes to utilize that apparatus for as many purposes as possible, different from only scooping elements lying on the group, such as bricks and the like.

Thus, e.g., the auxiliary means may comprise a snow shovel. Such a snow shovel is known in itself. The owner of a scooping apparatus, according to the invention, can in the open position of the cage, particularly a position in which the cage has a practically full opening at the lower side, now fix the auxiliary means in this cage.

In an alternative embodiment, this apparatus is characterized in that the auxiliary means comprise a brush rotatably drivable by means of third driving means.

In another embodiment the apparatus is characterized in that the auxiliary means comprise a shaft carrying extensions, such as blades or knives.

In order to ensure a ready replacement of the extensions that embodiment is preferred in which the extensions are removable.

For e.g., grinding scooped hard soil, particularly dry clay soil, it can be advantageous if the extensions are hingeably connected to said shaft.

In a certain embodiment the apparatus is characterized in that the shaft is rotatably drivable by means of fourth driving means.

In order to load the said fourth driving means as homogeneously as possible, preferably use is made of an embodiment in which the extensions are arranged on said shaft in a helical pattern.

In a practical embodiment, the apparatus is characterized in that the second, the third and/or the fourth driving means comprise a hydromotor which is fed from a hydraulic power source present in the vehicle through a hydraulic rotation coupling arranged in the area of one of the rotation bearings.

For sieving out finer substances and retaining more coarse matter, e.g. removing sand from scooped gravel, the apparatus may be characterized in that the auxiliary means comprise a sieve plate fixed to a cage part provided with openings and covering said openings, said at least one sieve plate having openings which are smaller than the openings in the relates cage part.

A mixer is obtained with an apparatus according to the invention, which is characterized in that the auxiliary means comprise a closed plate fixed to a cage part provided with openings and covering said openings.

It should be noted that the apparatus, according to the invention, performs a double function. On the one hand, it can always have the function of a scooping apparatus, comparable with a bulldozer, whilst on the other hand, it can also serve as a cleaning apparatus for, e.g., paving bricks, which bricks then, during transportation, can be cleaned by rotation of the cage and deposited elsewhere. Also, particularly with a fully closed cage, the apparatus may serve as a mixer. An important example of such an application is the cleaning of polluted soil. To this soil present in the scooping part of the apparatus, a powder is added that can treat the soil in such a way that it looses its noxiousness in a considerable degree, e.g., dries, hardens or the like. During the transportation of the polluted soil mixed with this active powder towards a dumping place, the intimate mixing of the soil with the powder can take place by rotating the apparatus. After this mixing has taken place during transport, if necessary, the, e.g., rust proof steel closed plates of the cage parts may be removed and then replaced by the sieve plates. If desired, during further transport or on the dumping location subsequently, the necessary separations may take place of finer and more coarse components in connection with the related choice of the desired dumping location.

It will be obvious that the sieve plates and/or the closed plates can be connected with the cage parts, e.g., by means of bolts.

Also the invention relates to a vehicle which is characterized by a scooping apparatus according to the specifications given hereinabove.

Furthermore, the invention relates to a coupling plate which is specially adapted to be used as a coupling means between such a vehicle and an apparatus according to the invention. There exists a so-called "quick exchange system", by means of which an apparatus of the present type may be adjusted for use on the one mark vehicle or the other mark vehicle. The disadvantage of the prior art systems is that the hydraulic couplings thereto have to be temporarily interrupted. This is accompanied by a premature wear of particularly the related shaft parts in the area of the rotating bearings. Therefore, it is desired to design this coupling in such a way that it is very readily adapted for different marks and furthermore, allows in this way a very simple adjustment from pushing operation to pulling operation.

The coupling plate, according to the invention, is adapted thereto and allows a rotation over 180° of the cage. Thus, the scooping apparatus remains intact, without the necessity of decoupling the rotation shafts. This highly contributes to the long lifetime of the scooping apparatus.

BRIEF DESCRIPTION OF THE DRAWINGS

The invention will now be elucidated with reference to the annexed drawings, wherein:

FIG. 17 is a plan side view showing the relation of the scoop part and the flap part when the cage is closed.

FIG. 18 is a plan side view showing the relation of the scoop part and the flap part when the cage is open.

DESCRIPTION OF PREFERRED EMBODIMENTS

Figure 1:
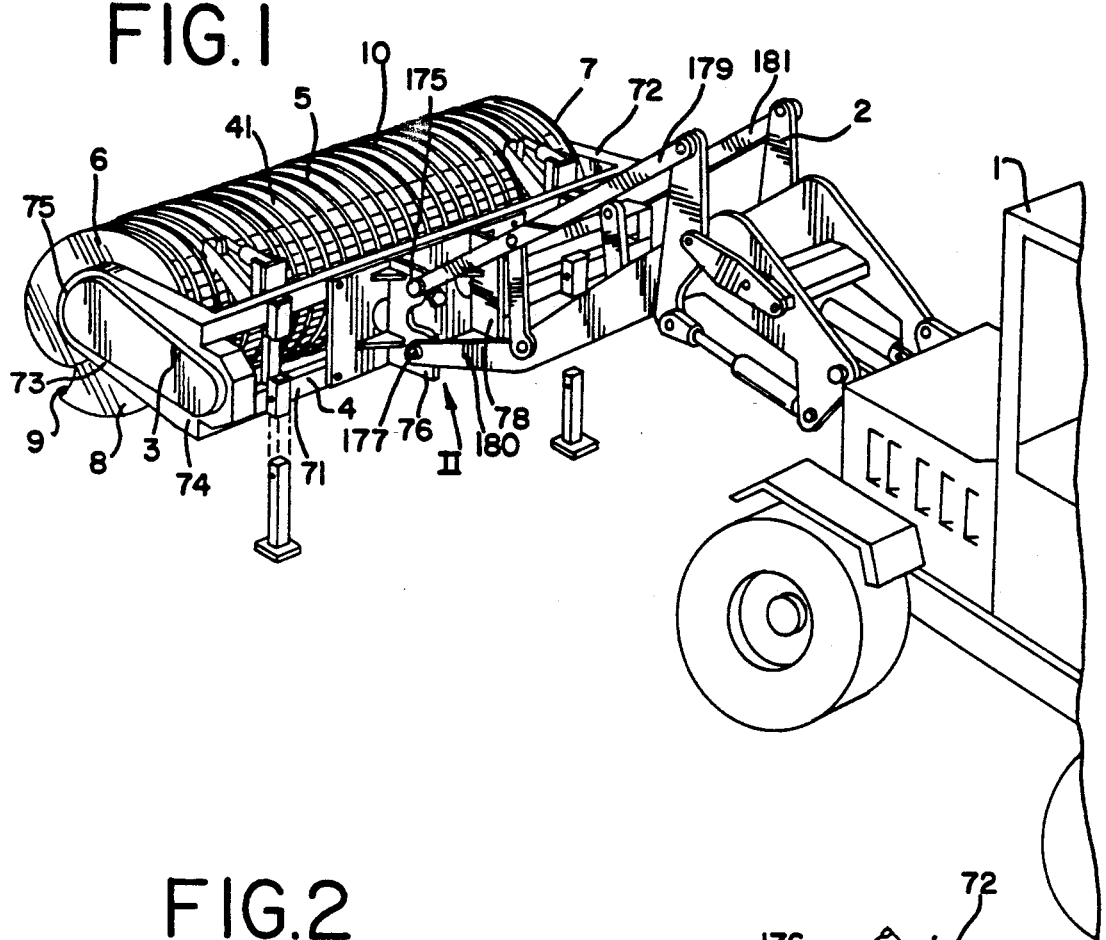
FIG. 1 shows a perspective view of a device according to the invention.

FIG. 1 shows a vehicle 1 which carried a pick-up device 3 by means of a bearing frame 2.

This pick-up device comprises a frame 4 and, supported rotatably by that frame 4, a substantially cylindrical cage 5, which itself comprises: two end walls 6, 7 rotatably connected to the frame 4 via rotation bearings to be described hereafter, and, supported by these end walls 6, 7, two cage parts, namely a scoop part 8 with a scooping edge 9 and a flap part 10, which two cage parts are mutually movable between a closed position, in which they form the cage, and an open position.

The scoop part 8 is rotatably movable coaxially with the center cylinder axis of the cage 5. The flap or lid part 10 is rotatably movable with respect to an axis parallel to, and located at a distance from, the axis of rotation of the scoop part 8. Referring to FIGS. 17 and 18, the rotation axis of the flap part 10 relative to the scoop part 8 is located at a constant radial distance from the rotation axis of the scoop part 8 which coincides with the center axis of the cage 5. The distance between the rotation axis of the flap part 10 and the center axis of the cage 5 is more than zero, but not more than about two thirds of the radius of the cage 5.

Figure 2:
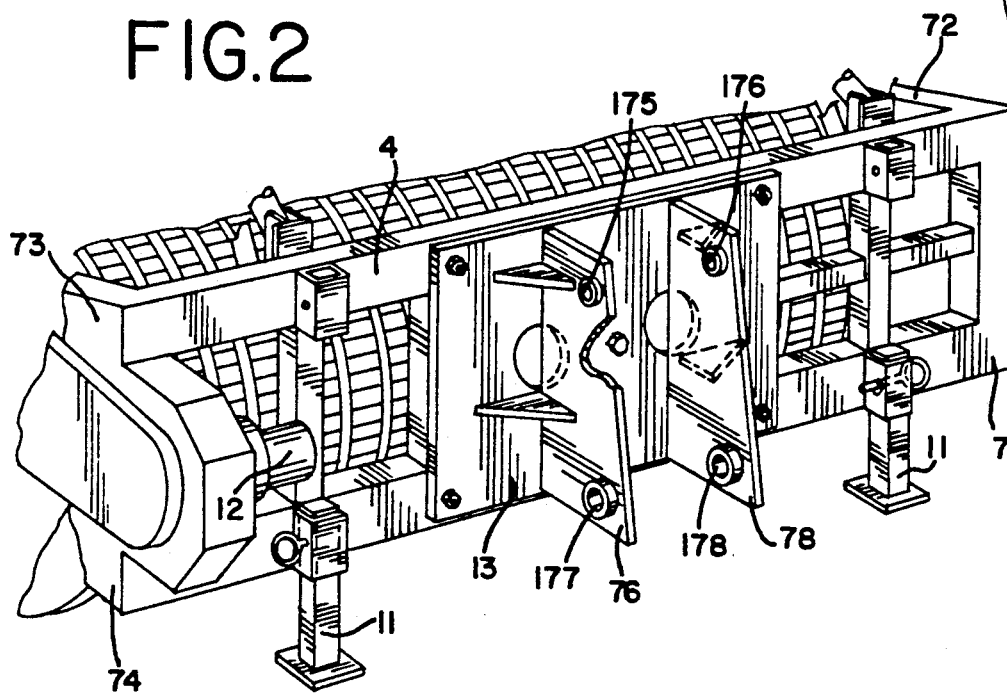
FIG. 2 shows the detail II from FIG. 1.

FIG. 2 shows an enlarged scale the frame 4 which, for reasons to be described further, can support temporarily on the ground by means of legs 11. The frame bears a hydraulic drive motor 12, which can drive the cage 5 in rotation via a chain (not drawn). The frame 4 is supported by the bearing frame 2 by means of a coupling plate 13 which is embodied such that it can also mutually couple the said frames in the reversed position. This aspect of the invention will be further elucidated with reference to FIG. 9.

Referring to FIGS. 1 and 2, the frame 4 includes a long back portion 71 and two shorter side brackets 72 and 73 extending perpendicular to the back portion 71. Each of the side brackets 72 and 73 has a first end 74 adjacent to the back portion 71 and a second end 75 remote from the back portion 71. The walls 6 and 7 of the cage 5 are rotatably mounted to both side brackets 72 and 73 adjacent to the second ends 75. The flap portion 10 can be rotatably mounted relative to the scoop part 8 as shown in FIGS. 17 and 18.

More specifically, referring to FIGS. 17 and 18, the semi-cylindrical scoop part 8 with the scooping edge 9 is firmly mounted to the end walls 6 and 7 which, in turn, are rotatably mounted to the side brackets 72 and 73 at the center rotation axis 81. The flap part 10 with flap edge 100 is firmly mounted to a different pair of end walls 101 and 102 (not shown). The end walls 101 and 102 are rotatably mounted to the end walls 6 and 7 at the off-center axis 103 which is parallel to, and at a distance from, the center axis 81. The distance between the axis 103 and the center axis 81 is more than zero but not more than about two-thirds of the distance between the center axis 81 and the semi-cylindrical scoop part 8.

By mounting the flap part 10 for rotation relative to the scoop part 8, and not to the frame 4, certain advantages are achieved. First, the position of the flap part 10 relative to the scoop part 8 can be fixed so that, when the cage 5 is rotated, the flap part 10 need not be independently rotated in order to maintain the same position relative to the scoop part 8. For example, the flap part 10 can be locked into a closed position as shown in FIG. 17. Then, the scoop part 8 can be rotated as much as the operator desires, without requiring any independent adjustment of the flap part 10 in order to maintain the closed position.

Second, the number of possible positions of the flap part 10 relative to the scoop part 8 is maximized. Regardless of the position of rotation of the scoop part 8, the flap part 10 can be fully opened, fully closed, or in any partially open position. The position of the flap part 10 relative to the scoop part 8 is in no way influenced by, or restricted by, the position of rotation of the scoop part 8.

Figure 3:
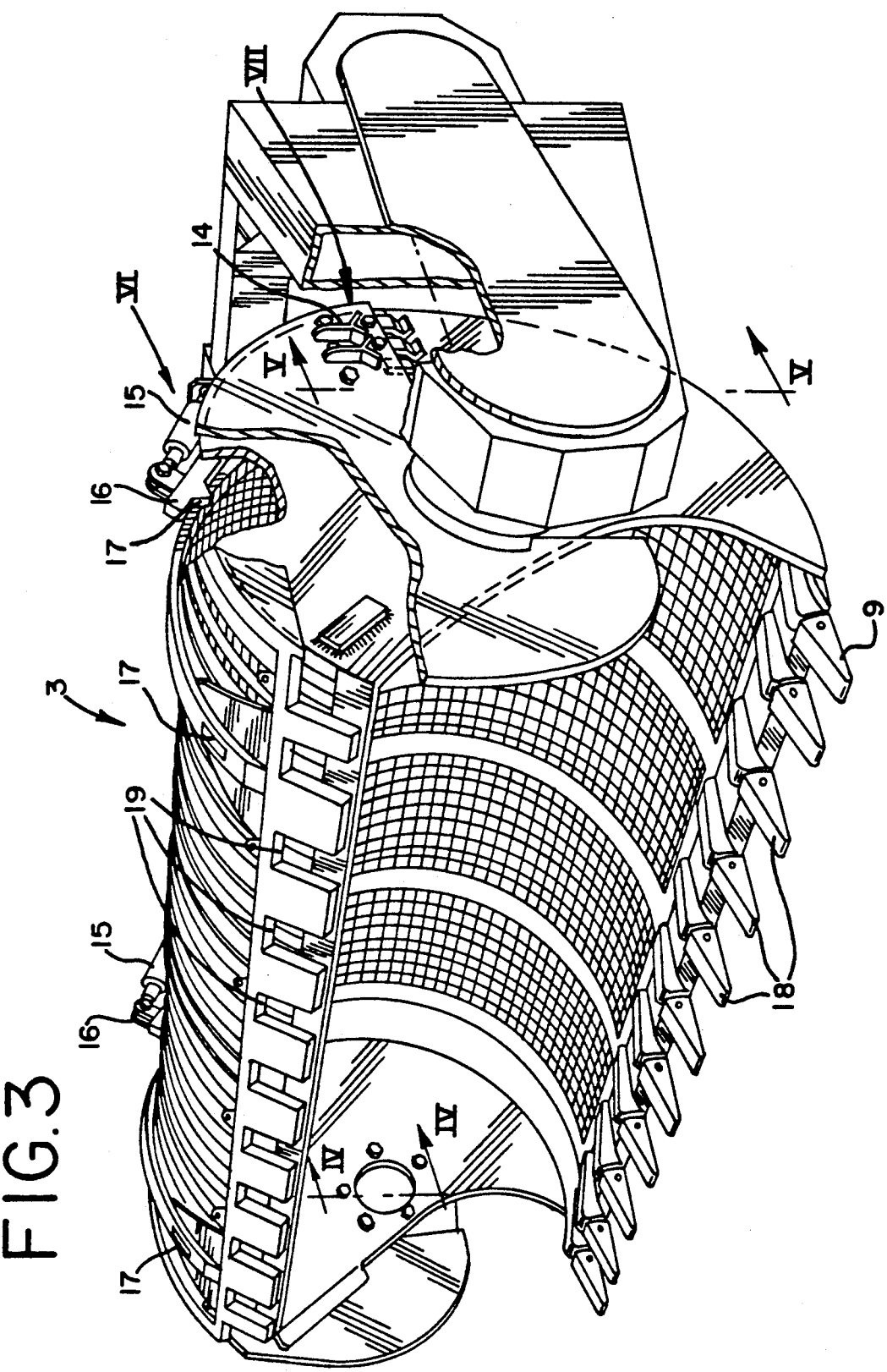
FIG. 3 shows on an enlarged scale a perspective view, obliquely from the front side of the device according to FIG. 1 and partially broken away.

FIG. 3 shows the device 3 in more detail. The coupling between the scoop part 8 and the flap part 10 for joint rotation takes place by means of a ratchet construction generally designed in this figure with 14.

Hydraulic cylinders 15 are coupled to ratchets 16 which can engage in a recess 17 in the flap part 10. The flap part can thus be locked in a desired angular position relative to the frame.

The scooping edge 9 comprises teeth 18 which in the closed situation of the cage 5 are received in recesses 19 in the corresponding edge of the flap part 10.

Figure 4:
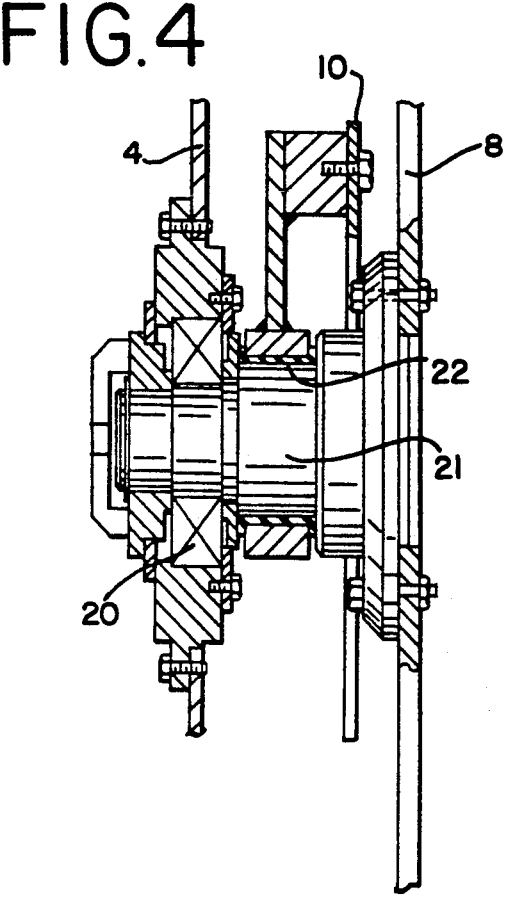
FIG. 4 shows the section IV—IV according to FIG. 3.

FIG. 4 shows the detail IV of FIG. 3 on an enlarged scale. The frame 4 supports a bearing 20 which carries the scoop part 8 via a shaft 21. The shaft 21 supports the flap part 10 via a slide bearing 22.

Figure 5:
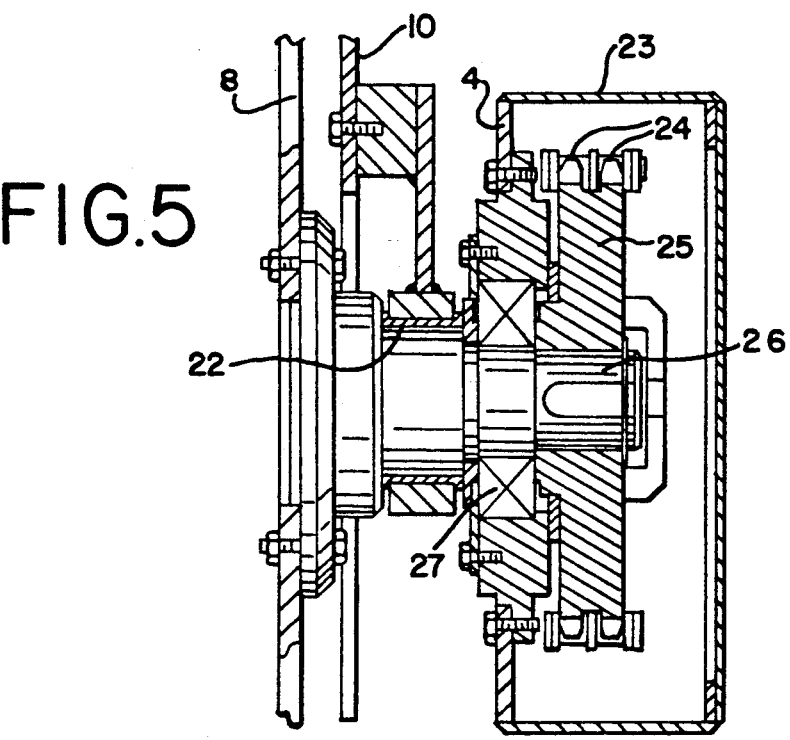
FIG. 5 shows the section V—V according to FIG. 3.

FIG. 5 shows the detail V from FIG. 3 on a larger scale. A chain casing 23 forms part of the frame 4. This accommodates the aforesaid drive chain 24, which runs over a drive gear 25 for driving thereof by the hydromotor 12. The drive gear 25 drives a drive shaft 26 which is supported by the frame 4 via a bearing 27. The construction is otherwise the same as that according to FIG. 4.

Figure 6:
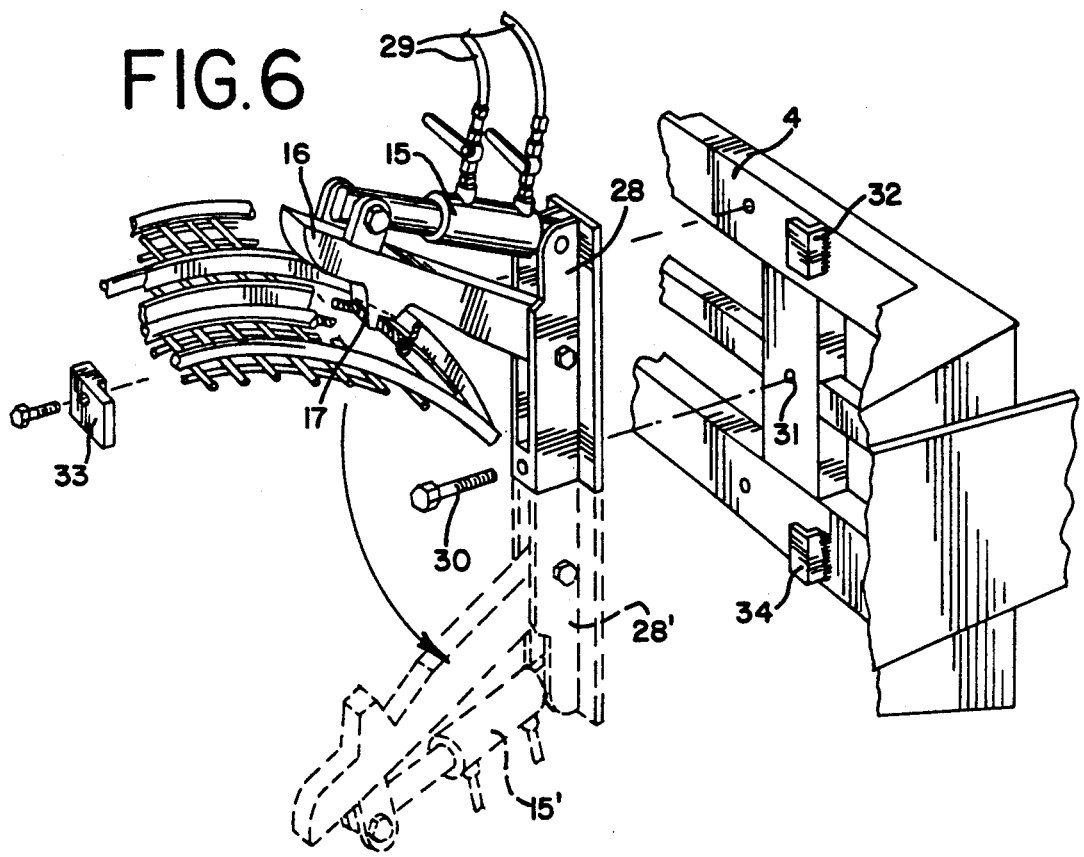
FIG. 6 shows the detail VI—VI according to FIG. 3 on an enlarged scale.

FIG. 6 shows the method of fixing a hydraulic cylinder 15 to the frame 4. The cylinder 15 is carried pivotably by a support 28 which can be coupled to the frame 4 by means of screws. The hydraulic cylinder 15 is also pivotably coupled to the ratchet 16. By energizing the cylinder 15 via hydraulic lines 29 the ratchet can at choice be in or out of engagement with the recess 17. The support 28 can be coupled to the frame 4 in a central threaded hole 31 using a bolt 30. By means of an L-profile 32 and a corresponding fastening element 33 the support 28 is held in its desired position.

Because, as will be further explained with reference to the figures shown in FIG. 9a through 9d, the cage can be coupled to the frame 4 in two mutually opposite positions a corresponding reversal of the support 28 is necessary. As is shown in FIG. 6 with broken lines, the frame can also be turned through 180°, whereby it arrives at the position indicated with 28', wherein it is held in place by the bolt 30 and a second L-profile 34. This revolution is also the reason for the presence of two recesses 17 in the cage 5. These recesses are placed symmetrically relative to the vertical and correspond in engagement with respectively the pushing position and pulling position of the cage 5 to be described hereinbelow.

Figure 7:
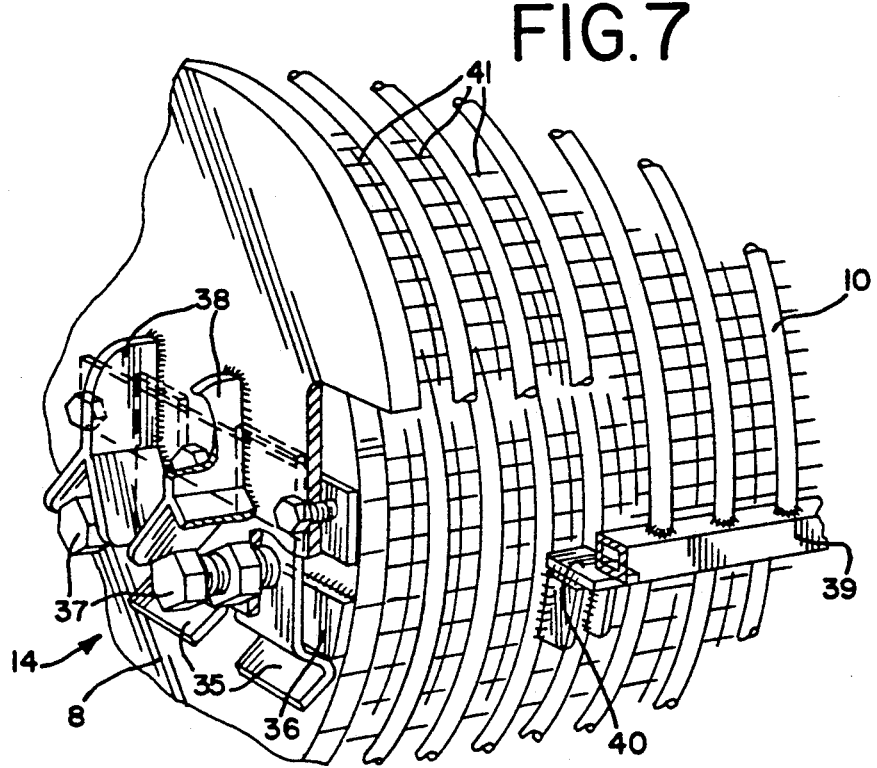
FIG. 7 shows the detail VII—VII according to FIG. 3 on an enlarged scale.
Figure 8:
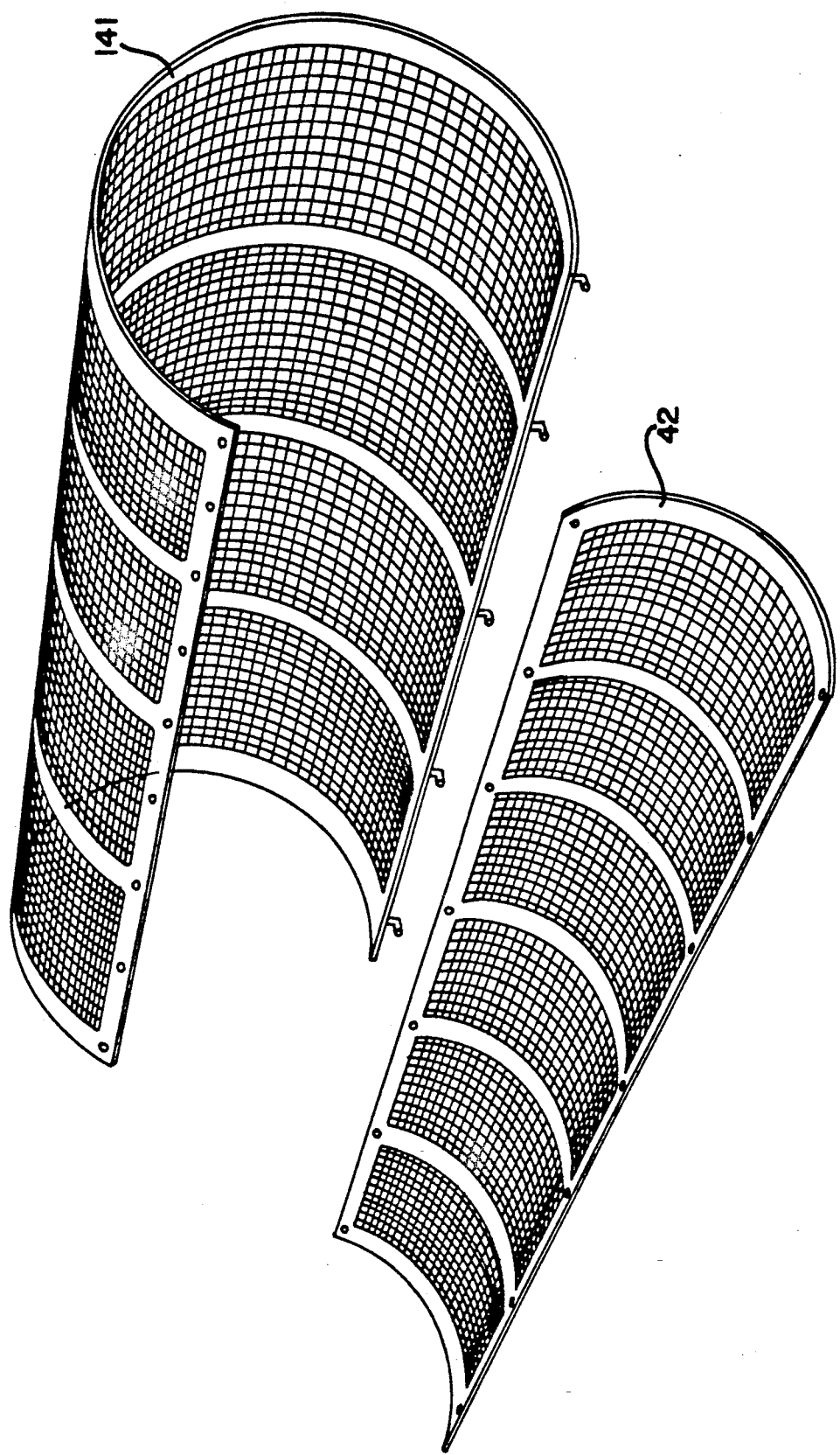
FIG. 8 shows in perspective view two sieve plates for receiving in a drum.

FIG. 7 shows the ratchet construction 14 which serves for mutually locking the scoop part 8 and the flap part 10 against rotation. Two spring-loaded ratchets 35 in the form of pre-formed steel strips co-act with a ridge 36. Through mutual relative rotation of the two cage parts 8, 10 the ratchets 35 can pass over the ridge 36, whereby coupling is effected. By driving the scoop part 8 the flap part 10 is carried along. In order to be certain under all circumstances that the correct force is transmitted for this purpose by the ratchet construction 14, adjusting bolts 37 are present with which the resilience of the ratchets 35 can be controlled. To prevent dirtying of the ratchet construction 14 as far as possible during operation, Y-shaped protectors 38 are arranged.

The flap part 10 can rest in its end position with beam 39 on a shoulder 40 on the scoop part 8.

The cage construction of the cage 5 is completely open and comprises arcuate bars 41. In order to now be able to use the cage as sieving device with a smaller mesh width, the scoop part can be covered on the inside with a scoop sieve plate 141, while the flap part is provided on the inside with a flap sieve plate 42. The scoop sieve plate 141 can be attached by pushing hooks and by means of bolts; the flap sieve plate 42 is attached only by means of bolts.

Figure 9A:
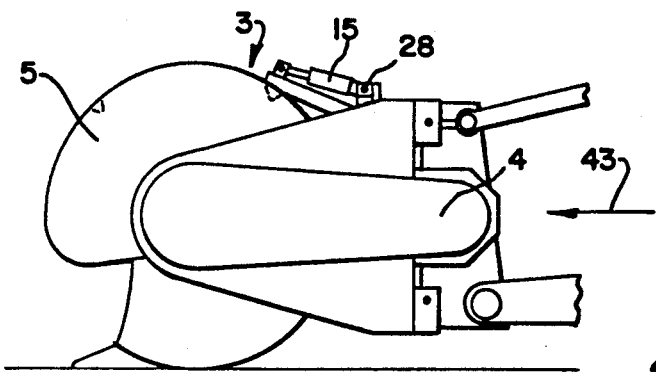
FIG. 9a, 9b, 9c and 9d show schematically four phases of a process for coupling the device to the other side of a scoop.
Figure 9B:
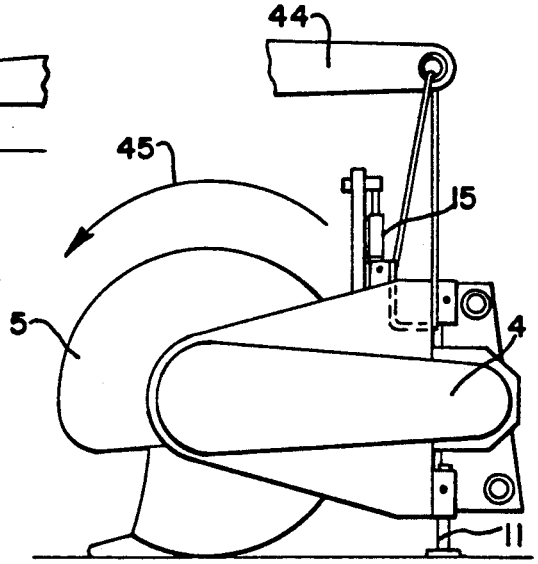
Figure 9C:
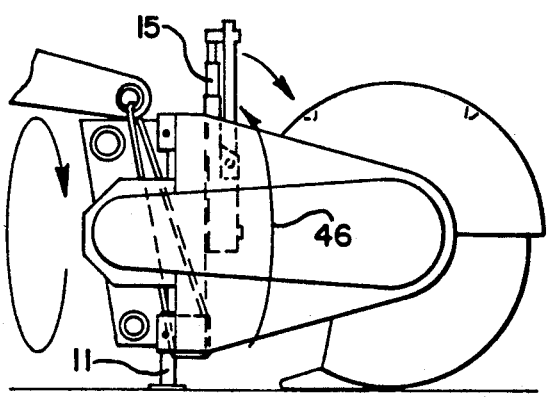
Figure 9D:
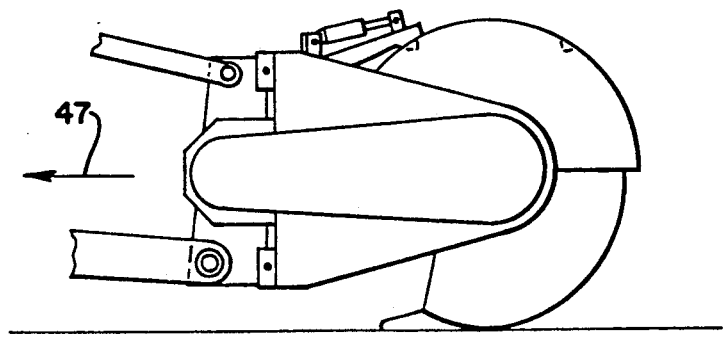

FIG. 9a shows the device according to the invention in operation. The vehicle is situated in this case on the right-hand side, and the action of the combination is "pushing", as the arrow 43 indicates. In order to also exert a "pulling" action the frame 4 is lifted over the cage 5 by means of a hoist 44 according to the arrow 45, so that the frame 4 comes to stand in the position indicated on FIG. 9c, respectively supported by the legs 11 on the one side and on the other side. In the meantime the hydraulic cylinder with accessories (see FIG. 6) is carried to the position turned through 180°, as indicated by the arrow 46, whereafter, following rotation through 180° of the coupling plate 13, coupling with the vehicle takes place again and the configuration shown in FIG. 9d is obtained, whereby the vehicle can serve to pull the device 3 according to the invention as indicated by the arrow 47. Decoupling and recoupling of the hydraulic lines of the hydraulic cylinders 15 is not described.

The ability to reverse the scooping apparatus between a "pushing" and a "pulling" orientation relative to a vehicle, results from the use of a special "reversible" coupling system located on the back portion 71 of the frame 4. Referring again to FIG. 2, the back portion 71 includes the center coupling plate 13 which is rectangular in shape and which includes a pair of coupling brackets 76 and 78 perpendicular to the back portion 71 and coupling plate 13. The coupling brackets 76 and 78 are parallel to each other as shown. Located on the coupling brackets 76 and 78 are four coupling joints 175, 176, 177 and 178 which can be used for coupling the frame 4 to a vehicle.

Referring again to FIG. 1, the coupling joints 175, 176, 177 and 178 join the two coupling brackets 76 and 78 with four coupling arms 179, 180, 181 and 182 (not visible). The coupling arms 179, 180, 181 and 182 are part of the overall bearing frame 2 which is used in conjunction with the vehicle 1 to carry the pick-up device 3. Any of the four coupling arms can be connected to any of the four coupling joints, thereby facilitating the reversible connection between the pick-up device 3 and the vehicle 1.

Figure 10:
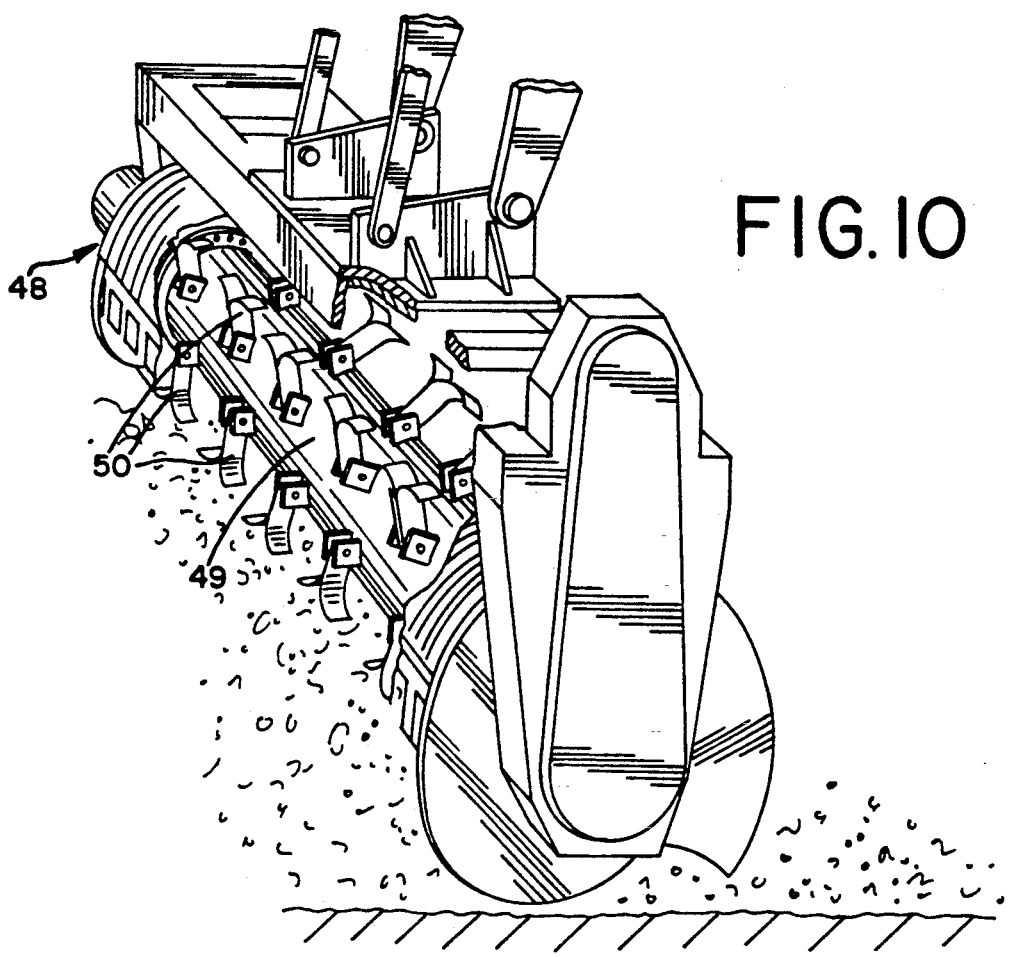
FIG. 10 is a partially broken away perspective view of a device according to the invention capable of mixing and cutting.

FIG. 10 shows a device according to the invention which can operate as pick-up, chopper and sieving device. The device 48 comprises for this purpose a shaft 49, on which a number of protrusions 50 are pivotally attached.

Figure 11:
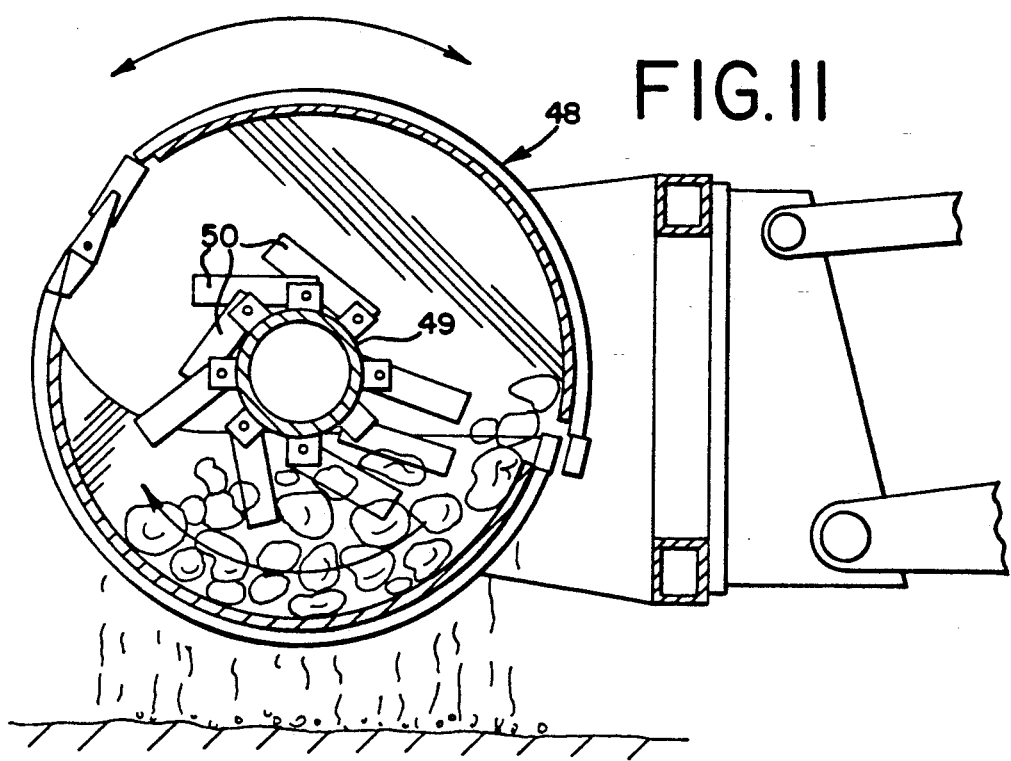
FIG. 11 is a cross section through the device of FIG. 10.

FIG. 11 shows in cross section the phase in which the device 48 is operating as chopper.

Figure 12:
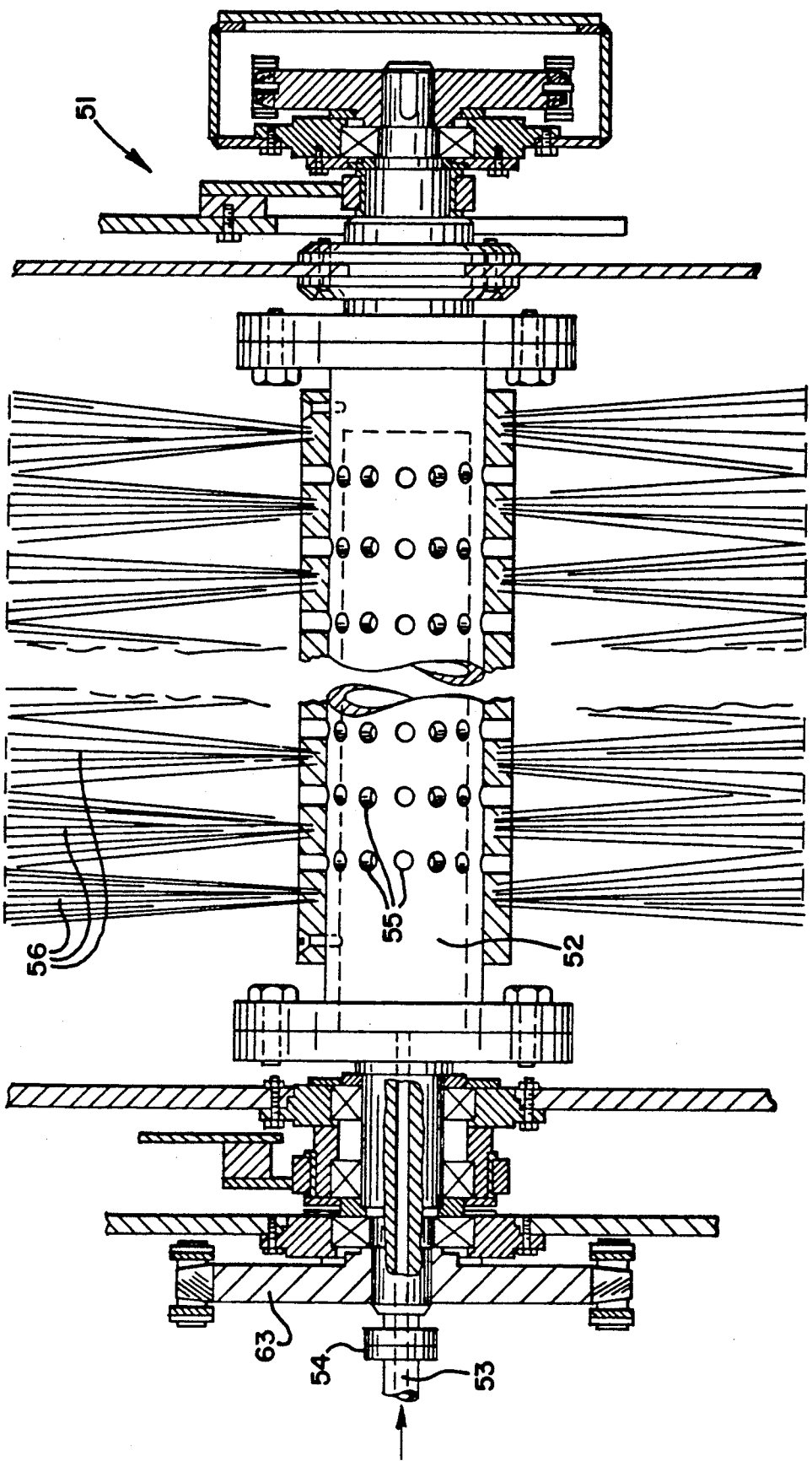
FIG. 12 shows a cross section through a rotor with a hollow shaft with perforations for injection water and with brushing means.

FIG. 12 shows a device 51 with a central shaft 52 which takes a shallow form and which can guide liquid from outside via an axial inlet 53 and a rotation coupling 54 to perforations 55 in the shaft wall, through which for instance washing water can be used to clean harvested products during rotation of the closed cage 5. To this end, the shaft 52 carries brushes 56.

Figure 13:
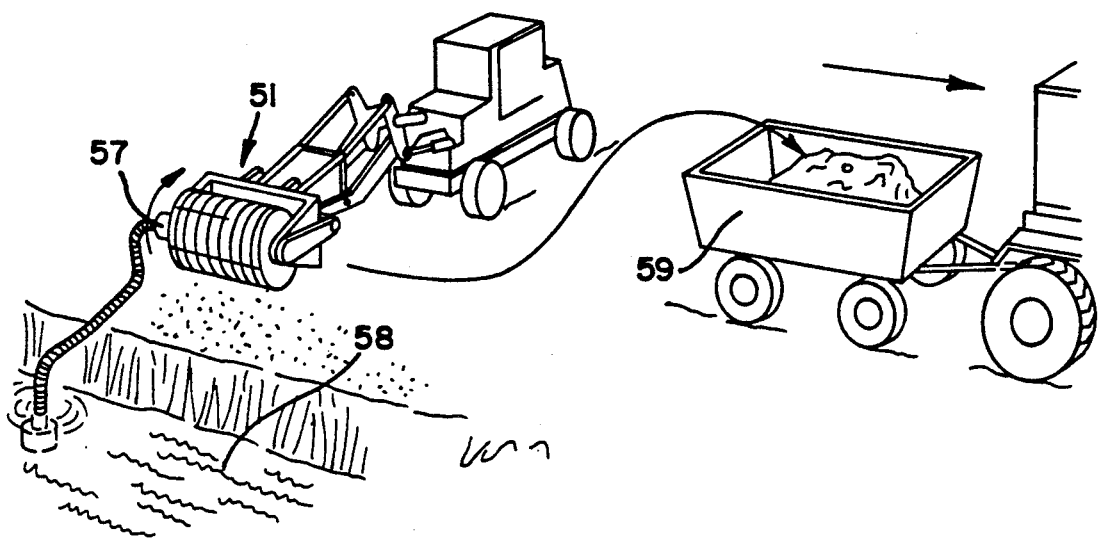
FIG. 13, 14 and 15 show schematically a number of possible applications of the device according to the invention.

FIG. 13 shows the manner in which the device 51 can be used with water which is supplied by means of a pump 57 from a water channel 58. The cleaned products are then loaded into a transport container 59.

Figure 14:
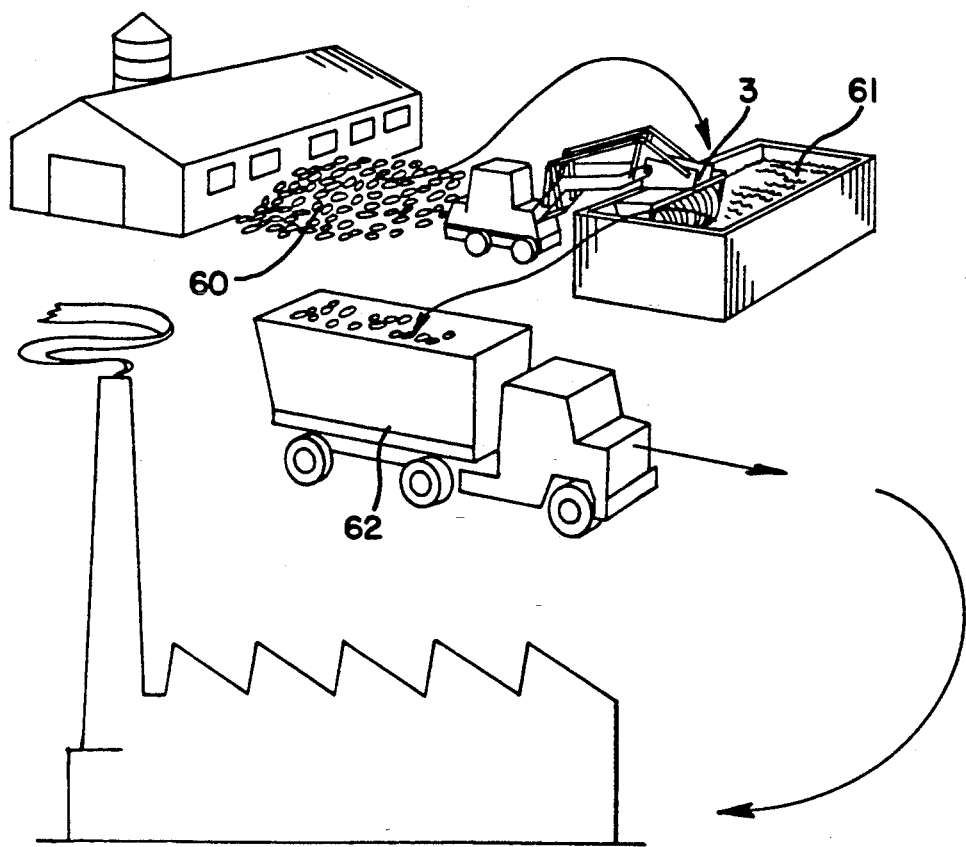

FIG. 14 shows use of the device 3, wherein harvest products 60 are picked up, carried in the closed cage, immersed in a water pool 61 and cleaned therein by rotation of the closed cage, whereafter the cleaned products are deposited in a truck 62.

Figure 15:
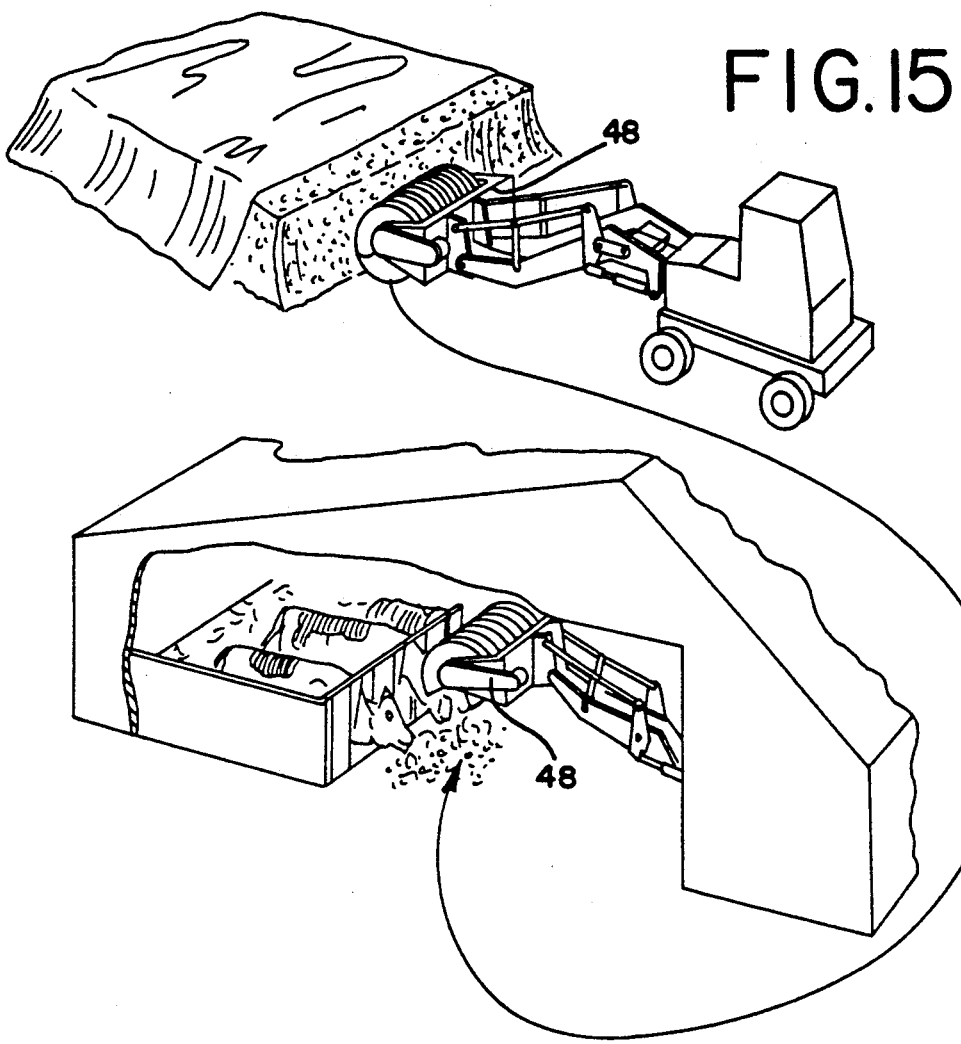

FIG. 15 shows application of the device 48 as silage remover, chopper and distributor.

Figure 16:
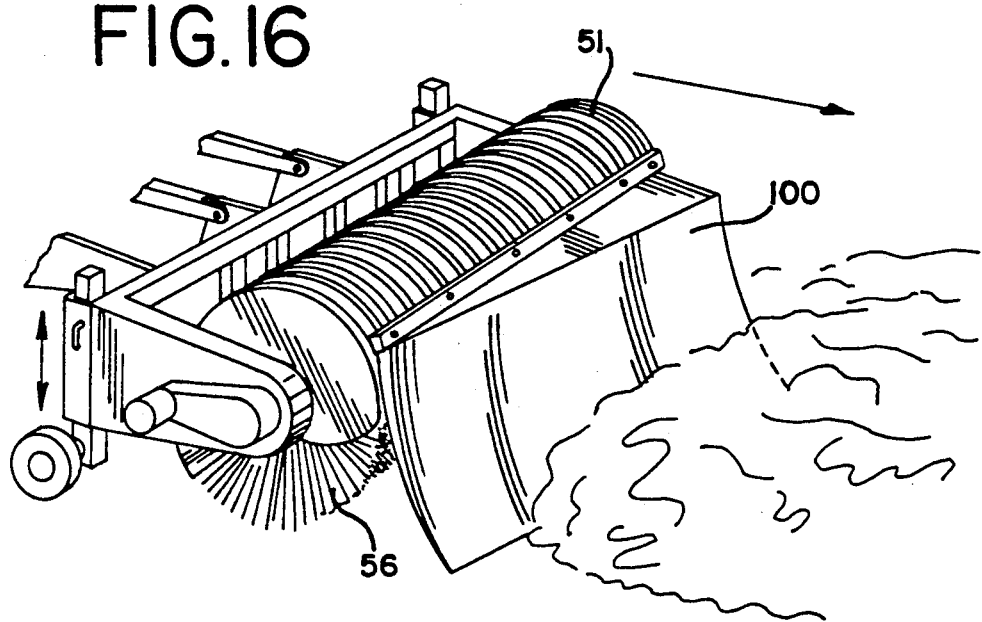
FIG. 16 is a schematic perspective view of a device according to the invention which bears a brush and a snow plough.

FIG. 16 finally shows the device 51, which is used with addition of a snow plough 100. The brush 56 is, as in the embodiment of FIG. 12, driven separately via a drive wheel 63. In this case, the hydro-motor 12 is not energized and only the brush is driven.

The pressure forces occurring during scooping are transferred from edge 9 to frame 4 by means of cooperating stoppers 39, 40.

It will be apparent that the invention is not limited to the above stated and discussed embodiments.

I claim:

1. A material handling apparatus comprising:
    a frame having a first end and a second end, said frame coupled at said first end with a vehicle by a coupling system; and
    an enclosure attached to said second end of said frame, said enclosure having a radius and longitudinal first and second axes;
    said enclosure comprising a scooping part, a scooping edge, and a first pair of end walls firmly mounted to the scooping part and rotatably mounted to the second end of the frame about the first longitudinal axis;
    said enclosure further comprising a flap part, a flap edge, and a second pair of end walls firmly mounted to the flap part, rotatably mounted to the first pair of end walls about the second longitudinal axis, and not mounted to the frame;
    said first axis of rotation located at a distance from said second axis of rotation, said distance being no greater than about two thirds of said radius of said enclosure;
    said flap part being rotatably movable between a closed position in which said scooping edge is proximate said flap edge and an open position in which said scooping edge is remote from said flap edge.

2. The apparatus of claim 1 wherein said coupling system comprises a reversible coupling plate adapted for reversible connection between the material handling apparatus and the vehicle, whereby the material handling apparatus can be either pushed or pulled by the vehicle.

3. The apparatus of claim 1 further comprising a first driving system for rotatably driving at least one of said parts of said enclosure.

4. The apparatus of claim 3 further comprising a second driving system for moving said parts of said enclosure between said closed position and said opened position.

5. The apparatus of claim 4 wherein said second driving system comprises a motor powered by said vehicle.

6. The apparatus of claim 3 wherein said first driving system comprises a chain and sprocket connecting at least one of said enclosure parts to a motor.

7. The apparatus of claim 1 further comprising a fixing system for fixing said lid part in a position relative to said frame.

8. The apparatus of claim 7 wherein said fixing system comprises a ratchet and a removable pawl positioned to engage said ratchet and fix said position of said flap part relative to said frame.

9. The apparatus of claim 1 further comprising a locking system for mutually locking said scoop part and said flap part against independent rotation of the flap part.

10. The apparatus of claim 9 wherein said locking system comprises a ratchet and a pawl positioned to engage said ratchet and lock said flap part and said scoop part together.

11. The apparatus of claim 9 wherein said locking system comprises a sloping cam arranged a first enclosure part an a spring loaded pawl arranged on a second enclosure part and cooperating with said sloping cam.

12. The apparatus of claim 1 further comprising a snow plough connected to said enclosure and a rotatable brush positioned to brush away any snow not plowed by said plough, said brush being rotated by a driving system.

13. The apparatus of claim 12 wherein said driving system comprises a motor powered by said vehicle.

14. The apparatus of claim 1 further comprising a removable shaft carrying extension, said shaft carrying extension is connected to a shaft, said shaft connected to said enclosure.

15. The apparatus of claim 14 wherein said shaft carrying extension comprises a blade connected to said shaft.

16. The apparatus of claim 14 wherein said shaft carrying extension is drivable by a driving system.

17. The apparatus of claim 16 wherein said shaft carrying extension is arranged in a helical pattern.

18. The device of claim 1 wherein the scoop part further comprises a scoop sieve plate attached to said scoop part.

19. The device of claim 1 wherein the lid part further comprises a lid sieve plate attached to said lid part.

20. A material handling apparatus comprising:
    a frame coupled to a vehicle;
    an enclosure rotatably carried by said frame, said enclosure comprising a scooping part and a lid part, said scooping part and said lid part being relatively movable between a closed position in which said scooping edge is proximate to said lid edge and an open position in which said scooping edge is not proximate to said lid edge; and
    a hollow shaft coaxial to said enclosure, said shaft connectable to a source of liquid, said shaft having at least one perforation so that said liquid may transported by said shaft through said perforations to spray the interior of said enclosure, said shaft further having at least one brush associated with said shaft.

21. The apparatus of claim 20 wherein said frame comprises an elongate framework, said framework having a pair of extensions, said extensions each having an end, said ends of said extensions rotatably supporting said enclosure, said frame further comprises a support system to support said frame when said frame is uncoupled from said vehicle, whereby said frame may be coupled to either a first end of said vehicle or a second end of said vehicle, said frame further may be changed from being attached to said first end of said vehicle to being attached to said first end of said vehicle by uncoupling said frame from said first end of said vehicle, rotating said frame about said longitudinal axis of said enclosure without unfastening said enclosure from said frame and then coupling said frame to second end of said vehicle.

22. A material handling apparatus, comprising:
a frame having a back portion an two side brackets extending from the back portion, each of the side brackets having a first end adjacent to the back portion and a second end remote from the back portion;
a cage rotatably mounted to the second ends of the side brackets about a first axis, the cage including a first pair of end walls, a scoop part firmly engaging the first pair of end walls, a second pair of end walls rotatably mounted to the first pair of end walls about a second axis spaced from the first axis, and a flap part firmly engaging the second pair of end walls, wherein at least one pair of end walls is not mounted to the frame; and
a coupling device mounted to the back portion of the frame for coupling the frame to a vehicle.

23. The apparatus of claim 22 wherein said coupling device comprises a coupling plate, two coupling brackets perpendicular to the coupling plate, and a plurality of coupling joints on the coupling brackets adapted for reversible coupling with the vehicle, whereby the material handling apparatus can be either pushed or pulled by the vehicle.

24. The apparatus of claim 22 further comprising a first driving system for rotatably driving the cage about the first axis.

25. The apparatus of claim 24 wherein said first driving system comprises a chain and sprocket connecting at least one of said cage parts to a motor.

26. The apparatus of claim 22 further comprising a second driving system for rotatably driving the flap part about the second axis.

27. The apparatus of claim 26 wherein said second driving system comprises a motor powered by said vehicle.

28. The apparatus of claim 22 further comprising a first fixing system for fixing said flap part in a position relative to said scoop part.

29. The apparatus of claim 28 wherein said first fixing system comprises a ratchet and a pawl positioned to engage said ratchet and fix said position of said flap part relative to said scoop part.

30. The apparatus of claim 22 further comprising a snow plough connected to said enclosure and a rotatable brush positioned to brush away any snow not plowed by said plough, said brush being rotated by a driving system.

31. The apparatus of claim 22 further comprising a shaft carrying extension, said shaft carrying extension connected to a shaft, said shaft connected to said cage.

32. The apparatus of claim 31 wherein said shaft carrying extension comprises a blade connected to said shaft.

33. The apparatus of claim 32 wherein said blade is arranged in a helical pattern.

34. The apparatus of claim 31 wherein said shaft carrying extension is drivable by a driving system.

35. The apparatus of claim 22 wherein said frame further comprises a leg to support said frame when it is unconnected from said vehicle.

* * * * *

UNITED STATES PATENT AND TRADEMARK OFFICE
CERTIFICATE OF CORRECTION

PATENT NO. : 5,311,684
DATED : May 17, 1994
INVENTOR(S) : Rudolf Van Dalfsen

It is certified that error appears in the above-indentified patent and that said Letters Patent is hereby corrected as shown below:

In the Title

On the title page and in column 1, line 3, delete "THEREFORE" and substitute --THEREFOR--.

In the Claims

Col. 8, line 20,
In claim 11, line 2, after "arranged" insert --on--.
Col. 8, line 21,
In claim 11, line 3, delete "an" and substitute --and--.
Col. 8, line 57,
In claim 20, line 12, after "may" insert --be--.
Col. 8, line 63,
In claim 21, line 2, delete "elongate" and substitute --elongated--.
Col. 9, line 4,
In claim 21, line 11, delete "first" and substitute --second--.
Col. 9, line 11,
In claim 22, line 2, delete "an" and substitute --and--.

Signed and Sealed this

Sixth Day of June, 1995

Attest:

BRUCE LEHMAN

*Attesting Officer*                *Commissioner of Patents and Trademarks*